United States Patent [19]
Gasowski et al.

[11] Patent Number: 4,854,361
[45] Date of Patent: Aug. 8, 1989

[54] PNEUMATIC TIRES

[75] Inventors: Chester J. Gasowski, Uniontown; Michael A. Kolowski, Mogadore; John C. Smithkey, North Canton; Thomas L. Ford, Mogadore, all of Ohio

[73] Assignee: The Goodyear Tire & Rubber Company, Akron, Ohio

[21] Appl. No.: 135,497

[22] Filed: Dec. 21, 1987

Related U.S. Application Data

[63] Continuation of Ser. No. 877,940, Jun. 24, 1986, abandoned.

[51] Int. Cl.$^4$ .............................................. B60C 15/00
[52] U.S. Cl. ..................................... 152/552; 152/543
[58] Field of Search ............... 152/539, 540, 545, 547, 152/543, 552, 555

[56] References Cited

U.S. PATENT DOCUMENTS

| | | | |
|---|---|---|---|
| 1,309,308 | 7/1919 | Swinehart | 152/526 |
| 1,779,392 | 10/1930 | Darrow | 152/132 |
| 2,994,358 | 8/1961 | Trevaskis | 152/540 |
| 3,111,976 | 11/1963 | DeLobelle | 152/541 |
| 3,301,303 | 1/1967 | Travers | 152/545 |
| 3,392,773 | 7/1968 | Warren et al. | 152/541 |
| 3,557,860 | 1/1971 | Maiocchi . | |
| 3,612,138 | 10/1971 | Ravenhall | 152/543 |
| 3,638,705 | 2/1972 | Devienne et al. | 152/542 |
| 3,777,799 | 12/1973 | Montagne | 152/543 |
| 3,789,899 | 2/1974 | Kobayashi | 152/510 |
| 3,895,666 | 7/1975 | Inoue | 152/543 |
| 3,941,177 | 3/1976 | Okada et al. | 152/543 |
| 3,946,785 | 3/1976 | Powers et al. | 152/542 |
| 4,093,014 | 6/1978 | Tomoda et al. | 152/542 |
| 4,139,040 | 2/1979 | Samoto et al. | 152/547 X |
| 4,162,698 | 7/1979 | Merli et al. | 152/550 |
| 4,238,259 | 12/1980 | Gill et al. | 156/131 |
| 4,398,584 | 8/1983 | Tansei et al. | 152/543 |

FOREIGN PATENT DOCUMENTS

| | | |
|---|---|---|
| 76252/74 | 12/1974 | Australia . |
| 1189400 | 3/1965 | Fed. Rep. of Germany . |
| 1505025 | 5/1969 | Fed. Rep. of Germany . |
| 1605627 | 1/1970 | Fed. Rep. of Germany . |
| 2408474 | 8/1975 | Fed. Rep. of Germany . |
| 2936337 | 3/1981 | Fed. Rep. of Germany . |
| 1127521 | 12/1956 | France . |
| 1259008 | 3/1961 | France . |
| 1327810 | 4/1963 | France . |
| 1364021 | 5/1964 | France . |
| 2007285 | 1/1970 | France . |
| 2246406 | 5/1975 | France . |
| 58-105806 | of 1983 | Japan . |
| 870627 | 5/1987 | PCT Int'l Appl. . |
| 767378 | 1/1957 | United Kingdom . |
| 854971 | 11/1960 | United Kingdom . |
| 973246 | 10/1964 | United Kingdom . |
| 1000113 | 8/1965 | United Kingdom . |
| 1485485 | 9/1977 | United Kingdom . |
| 2033311 | 5/1980 | United Kingdom . |
| 2040836 | 9/1980 | United Kingdom . |

Primary Examiner—Raymond Hoch
Attorney, Agent, or Firm—L. R. Drayer

[57] ABSTRACT

The turn-up portion (217) of the carcass ply in the bead portion (219) of a pneumatic tire is interposed between the bead core (213) and a clamping member (231). The clamping member (231) comprises a heat shrinkable material that secures the turn-up in a desired location.

4 Claims, 1 Drawing Sheet

PNEUMATIC TIRES

This is a Continuation of Application Ser. No. 877,940 filed on June 24, 1986, now abandoned.

The present invention relates generally to the bead portion of a pneumatic tire, and more specifically to a tire having a bead portion which contains heat shrinkable material to secure the turn-up portion of a carcass ply, or plies, in a desired location.

The desirability of having the turn-up portion(s) of the carcass ply (or plies) of a pneumatic tire extend radially outwardly of the bead core the shortest possible distance is well recognized in the tire art. These advantages include better bead durability, and reduced material costs. One method of securing the turn-up portion of a carcass ply in a desired location, thus reducing the required turn-up height has been to place the turn-up between the bead core and an auxiliary annular metal locking member. Such a structure is taught in the following prior art patents: British Pat. Nos. 854,971; 1,000,113; German O.S. Pat. Nos. 1,605,627; and 2,936,337. One of the problems left unsolved by the prior art documents is that if the dimensions of both the bead core and the locking member are not extremely precise they will not act together to lock the turn-up portion of a carcass ply in place. Furthermore, the relative locations of the bead core and the locking member must be very precise, and the assembly would require expensive special equipment if such structures are to be manufactured in volume. These problems are overcome by the present invention.

There is provided in accordance with the present invention a pneumatic tire having a bead portion comprising:

(a) an annular bead core;

(b) a carcass ply anchored around said bead core, said carcass ply having a main portion and a turn-up portion; and (c) a clamping member disposed radially outwardly of said bead core with the turn-up portion of the carcass ply interposed between the clamping member and the bead core, said clamping member being adjacent to the turn-up portion of the carcass ply and comprising at least one cord of a non-metallic heat shrinkable material which has a permanent thermal shrinkage of at least 2%, said clamping member securing the turn-up portion of the carcass ply in a predetermined position.

There is provided in accordance with another aspect of the invention a pneumatic tire having a bead portion comprising:

(a) an annular bead core;

(b) a carcass ply anchored around said bead core, said carcass ply having a main portion and a turn-up portion, a radially outer edge of the turn-up portion being in contact with said main portion; and (c) a strip of side-by-side cords of a non-metallic heat shrinkable material which has a permanent thermal shrinkage of at least 2%, said cords being oriented at 0° to 75° with respect to the centerplane of the tire, said strip being disposed adjacent to said carcass ply on the side of the carcass ply distal from said bead core for a point located radially inwardly of the bead core to a point located radially outwardly of the bead core, said strip of cords securing the turn-up portion of the carcass ply in a predetermined position and protecting the carcass ply from damage.

The invention may be better understood by referring to the figures of the drawing wherein.

Figure 1:
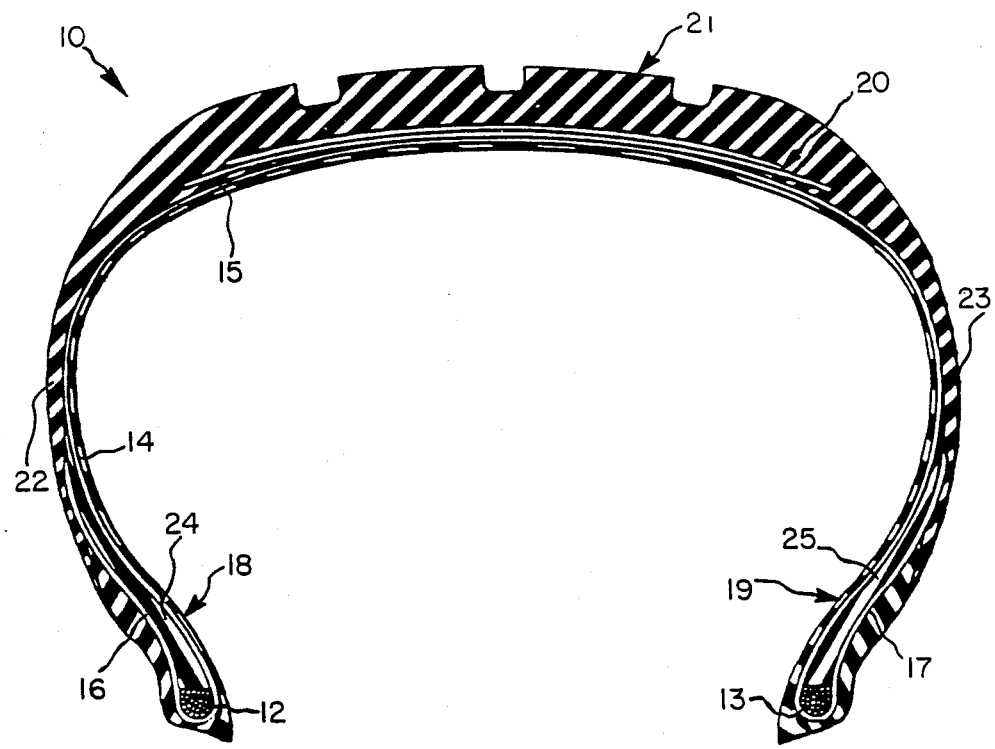
FIG. 1 is a cross-sectional view of a tire according to the prior art.

Referring first to FIG. 1 there is shown by way of example a cross-sectional view of a typical prior art pneumatic tire 10. A typical pneumatic tire of the type to which the present invention relates has a pair of substantially inextensible annular bead cores 12,13 which each comprise a plurality of metallic filaments, which filaments may or may not be twisted together to form a cable. At least one carcass ply 14 of metallic or non-metallic filaments, cords or cables has a main portion 15 that extends between the bead cores 12,13 and a turn-up portion 16,17 anchored around each of the bead cores. A belt structure 20 is disposed radially outwardly of the main portion of the carcass ply and a ground-engaging tread portion 21 is disposed radially outwardly of the belt structure. Sidewall portions 22,23 extend radially inwardly from the tread portion to the bead portions. A circumferentially extending filler strip or apex 24,25 of a suitable elastomeric material is interposed between the main portion 15 and each of the turn-up portions 16,17 of the carcass ply for the purpose of stiffening and reinforcing the bead portions and radially inner portions of the sidewalls of the tire. Other components such as chafer strips and toe guard strips may be located in the bead portions at the discretion of a tire designer.

As used herein and in the claims the terms "radial" and "radially" refer to directions going towards or away from the axis of rotation of a tire. The terms "axial" and "axially" indicate directions that are parallel to the axis of rotation of a tire.

Figure 2:
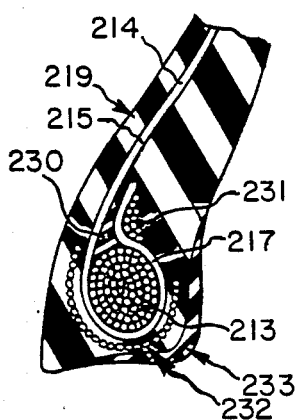

Referring next to FIG. 2 there is shown a bead portion 219 of a tire according to a preferred embodiment of the present invention. The carcass ply 214 has a main portion 215 that extends between both bead cores (not shown) of the tire and turn-up portions 217 that are anchored around each bead core 213. The bead core 213 comprises a plurality of metallic filaments which are not twisted together to form a cable and which have an alastomeric substance interposed between at least some of the filaments for the purpose of insulating the metallic filaments from one another. A portion of this insulating material 230 has been squeezed from between the filaments of the bead core during the tire shaping and molding process. In a tire according to this preferred embodiment the same elastomeric substance which is interposed between the turn-up portion of the carcass ply and the bead core as is contained in the bead core itself, and no other elastomeric substance is interposed between the turn-up portion 217 of the carcass ply and the bead core 213. It is understood that as used herein the carcass ply comprises reinforcing cords embedded in an elastomeric substance, and that these components are considered to be a single entity. Put another way, the tire of this invention does not need to have a filler strip or apex interposed between the turn-ups and main portion of the carcass ply, although a tire designer could employ an apex or filler strip if he so desires. Put another way, in the preferred embodiments of this invention, the radially outer edge of the turn-up portion of the carcass ply is disposed radially outwardly of the bead core a minimal distance and is in contact with the main portion of the carcass ply.

A clamping member 231 is disposed radially outwardly of the bead core 213, with the turn-up portion 217 of the carcass ply interposed between the clamping member and the bead core. The clamping member is directly adjacent to the turn-up portion of the carcass ply, and comprises at least one cord of a non-metallic heat shrinkable material which has a permanent thermal shrinkage of at least 2% which has been wrapped circumferentially about the bead core and carcass ply turn-up a plurality of times. As used herein a "plurality" means any whole or fractional number (e.g., 1.5, 2 or 2.2) greater than 1.0. As used herein, a "cord" is understood to be either a single filament or a plurality of filaments twisted together to form a cable.

As used herein and in the appended claims "permanent thermal shrinkage" is understood to mean the intrinsic dimensional stability of a material when it is exposed to an elevated temperature as indicated by the percentage of permanent shrinkage determined using the following test method. In this test method a cord is exposed to a temperature of 177° C. and its percentage of shrinkage is measured directly from a calibrated dial in a shrinkage meter, which determines the total shrinkage inherent in the material.

The apparatus used in this test method include:

(1) a Testrite Thermal Shrinkage Oven/Meter, Model T.S. 10AB, (or a later model of this same device) manufactured by Testrite, Ltd., Woodfield Works, Old Lane, Halifax, England, HX3 6TF;

(2) a timer; and (3) pretension weights ranging from 8 to 40 grams.

The test procedure is as follows:

1. Connect the shrinkage meter to a suitable means of power supply. Set test temperature at 177° C. on temperature regulator. Allow about 20 minutes for the oven to reach operating temperature—operating temperature is reached when the deviation monitor needle reaches and remains at the zero position of the monitor scale.

2. Cut fabric samples 660 mm in length. Make a loop at one end of each cord so that pretension weights can be hung therefrom.

3. Draw the sliding carriage forward. Secure the other end of the cord sample in the center of the stationary clamp located to the right of the sliding carriage.

4. Place the cord over the takeup drum to the left of the carriage and hang the proper pretension weight on the cord. The pretension weight should be 0.01 grams per denier of the cord. For example, a 1000/3 polyester cord (3 filaments of 1000 denier each) should have a pretension weight of 30 grams.

5. With the sample cord in position in the center of the pickup drum, set pointer to zero.

6. Gently push the carriage assembly with the cord sample forward to the fullest extent into the heated oven. Start timer immediately to record shrinkage.

7. At the end of two minutes read and record % total shrinkage from the calibrated scale indicated by the pointer.

8. Pull sliding carriage backward to remove sample from heated zone; immediately thereafter start timer. Read and record % permanent shrinkage after a one minute cooling period from the calibrated scale.

Tires according to the present invention have been manufactured using a clamping member in which the heat shrinkable material was 1260/2 Nylon 6,6, having a permanent thermal shrinkage of about 4%. A plurality of cords, in this instance 6, in side-by-side relationship were embedded in an elastomeric material to form a tape which was wrapped around the bead core and turn-up portion of the carcass ply two complete turns while maintaining tension on the tape. During the shaping and curing process the clamping member was distorted in cross-section, but it still functioned to secure the turn-up portion of the carcass ply in the desired location. It is understood that other nylon materials, as well as polyester or other heat shrinkable materials having a permanent thermal shrinkage of at least 2% may be employed in the practice of this invention.

The turn-up portion 217 extends radially outwardly of the bead core 213 a minimal distance to allow for some pull-down of the carcass ply during the shaping and curing process, otherwise the turn-up could end up not clamped in place by the bead core and clamping member. For example, in a passenger tire the edge of the turn-up portion may be located about 10 mm radially outwardly of the bead core. Of course the exact location of the radially outer edge of the turn-up portion of the carcass ply should be selected in accordance with good engineering practice depending upon the carcass ply material and the cross-sectional shape of the tire. However, in any case, the turn-up should not extend radially outwardly of the rim flange (not shown) when the tire is mounted upon its designated rim, while preferably the radially outer edge of the turn-up is in contact with the main portion of the carcass ply.

Other components that may be located in the bead portion include a toe guard 232 and a chafer strip 233. A "toe guard" is a layer of reinforcing cords folded around the carcass ply and bead core on the side of the carcass ply furthest away from the bead core. The primary purpose of the toe guard is to protect the bead from damage during mounting of the tire on a rim and subsequent use of the tire on a vehicle. The chafer may be either a tough elastomeric material that protects the bead portion from abrasion during mounting and use of the tire, or a layer of fabric extending from radially inwardly of the bead core to the same radial height as the edge of the turn-up.

It is understood that in place of having the clamping member comprise a strip of cords of a heat shrinkable material a single cord of heat shrinkable material could extend circumferentially about the bead core and turn-up portion of the carcass ply a plurality of times.

Figure 3:
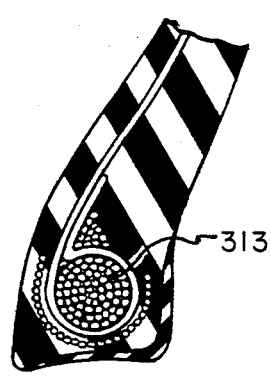
FIGS. 3-4 are cross-sectional views of the bead portions of the tires according to the present invention.

Referring to FIG. 3 there is shown another preferred embodiment of the invention in which the bead core 313 comprises a plurality of metallic filaments that have been twisted together to form an annular cable. In other respects this embodiment is substantially the same as that described with respect to FIG. 2.

Figure 4:
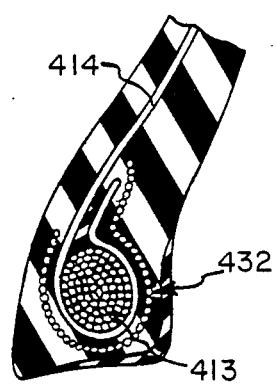

FIG. 4 shows yet another embodiment of the invention in which the toe guard 432 is folded around the carcass ply and bead core 413 such that it is adjacent to the carcass ply 414 from the main portion to that part of the turn-up portion which is located radially outwardly of the bead core. The clamping member (which in this embodiment also functions as a toe guard) comprises a plurality of cores of a heat shrinkable material arranged in a side-by-side relationship and oriented at an angle of between 10° and 45° with respect to the centerplane of the tire. That is to say, in this embodiment a single ply of fabric of side-by-side cords of heat shrinkable material acts as both a toe guard and a clamping member.

In the embodiment illustrated in FIG. 4, the clamping member/toe guard or even a clamping member/chafer comprises a strip of side-by-side cords of a heat shrinkable material embedded in a suitable elastomeric substance and having a permanent thermal shrinkage of at least 2%. This strip of cords extends circumferentially and extends in contact with the radially innermost carcass ply (or the only carcass ply) from a location radially inward of the bead core to a location radially outward of the bead core and closely adjacent to the main portion of the carcass ply, and there is no filler strip or apex disposed between the main portion and turn-up portion of the carcass ply. The side-by-side cords in the strip are preferably oriented at angles in the range of 10° to 45° with respect to the centerplane of the tire, but in any case at angles in the range of 0° to 75° with respect to the centerplane of the tire.

This use of a single component for dual purposes as either a toe guard/clamping member or chafer/clamping member provides not only the aforementioned advantages over the prior art but also provides economical use of materials, labor, and machine time.

While certain representative embodiments and details have been shown for the purpose of illustrating the invention, it will be apparent to those skilled in the art that various changes and modifications may be made therein without deviating from the spirit or scope of the invention.

We claim:

1. A pneumatic tire having a bead portion comprising:

(a) an annular bead core comprising a plurality of metallic filaments;

(b) a carcass ply anchored around said bead core, said carcass ply having a main portion and a turn-up portion; and (c) a clamping member disposed radially outwardly of said bead core and extending circumferentially thereabout, the turn-up portion of the carcass ply being radially interposed between and directly adjacent to both the clamping member and the bead core, said clamping member being adjacent to only the turn-up portion of the carcass ply and comprising a tape of an elastomeric material containing at least one cord of a non metallic heat shrinkable material which has permanent thermal shrinkage of at least 2%, said tape being directly wrapped circumferentially about the bead core and turn-up portion of the carcass ply a plurality of times, the only elastomeric substance interposed between the turn-up portion of the carcass ply and the bead core being the same as any elastomeric substance which is interposed between the filaments of the bead core, the radially outer edge of the turn-up portion of the carcass ply being in contact with the main portion of the carcass ply.

2. A pneumatic tire according to claim 1 wherein said clamping member comprises a plurality of cords of said heat shrinkable material, said cords being in side-by-side relationship and each extending circumferentially about said bead core and turn-up portion of the carcass ply more than one time.

3. A pneumatic tire according to claim 1 wherein said heat shrinkable material is nylon 6 or nylon 6,6.

4. A pneumatic tire according to claim 2 wherein said heat shrinkable material is nylon 6 or nylon 6,6.

* * * * *